United States Patent
Agarwalla et al.

(10) Patent No.: US 11,803,362 B2
(45) Date of Patent: Oct. 31, 2023

(54) LOCK-LEASE MANAGEMENT OF HARDWARE AND SOFTWARE MAINTENANCE, DEPLOYMENT, AND OPTIMIZATION OPERATIONS USING EFFECTIVE APPLICATION AVAILAILITY

(71) Applicant: Microsoft Technology Licensing, LLC, Redmond, WA (US)

(72) Inventors: Rajesh Agarwalla, San Ramon, CA (US); Clark Elliott Haskins, III, Albuquerque, NM (US); Dinesh Dhakal, Thane (IN); Samir Tata, Santa Clara, CA (US); Sankar Hariharan, Bangalore (IN); Lei Xia, Fremont, CA (US); Mark Lewis Randles, Ben Lomond, CA (US); Rui Shen, Mountain View, CA (US); Junkai Xue, Campbell, CA (US); Meng Zhang, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 70 days.

(21) Appl. No.: 17/545,342

(22) Filed: Dec. 8, 2021

(65) Prior Publication Data
US 2023/0176846 A1   Jun. 8, 2023

(51) Int. Cl.
*G06F 9/44* (2018.01)
*G06F 8/65* (2018.01)
*G06N 20/00* (2019.01)

(52) U.S. Cl.
CPC ............... *G06F 8/65* (2013.01); *G06N 20/00* (2019.01)

(58) Field of Classification Search
CPC .................................................. G06F 8/65

USPC ........................................................ 717/168
See application file for complete search history.

(56) References Cited

U.S. PATENT DOCUMENTS

| | | | |
|---|---|---|---|
| 7,970,746 B2 | 6/2011 | Seshadri et al. | |
| 8,195,976 B2 | 6/2012 | Rao et al. | |
| 8,504,319 B2 | 8/2013 | Qian et al. | |
| 8,660,021 B2 | 2/2014 | Qian et al. | |
| 10,339,573 B1 | 7/2019 | Wookey et al. | |
| 10,938,653 B2 | 3/2021 | Sadana et al. | |
| 2009/0271789 A1* | 10/2009 | Babich | G06F 9/526 718/100 |
| 2017/0124123 A1* | 5/2017 | Curtis-Maury et al. | G06F 16/2308 |
| 2021/0045193 A1 | 2/2021 | Mishra et al. | |

OTHER PUBLICATIONS

"Simplifying Network Operations through Data Center Automation", In White Paper of Arista, May 8, 2020, 8 Pages.

* cited by examiner

*Primary Examiner* — Evral E Bodden
(74) *Attorney, Agent, or Firm* — Schwegman, Lundberg & Woessner, P.A.

(57) ABSTRACT

In an example embodiment, the concept of effective application availability is introduced. In a data center, there may be a minimum amount of a particular resource that is needed to continue proper functioning of an application. This may be termed a safe application availability limit. The safe application availability limit may be obtained or determined using a safe application availability limit rule. An effective application availability may be calculated by taking a current application availability and subtracting it by an availability loss from a requested operation. The effective application availability may then be compared to the safe application availability limit in order to determine whether to permit the operation to be performed at the requested time, or whether to request that the operation be attempted again at some later time.

20 Claims, 7 Drawing Sheets

LOCK-LEASE MANAGEMENT OF HARDWARE AND SOFTWARE MAINTENANCE, DEPLOYMENT, AND OPTIMIZATION OPERATIONS USING EFFECTIVE APPLICATION AVAILAILITY

TECHNICAL FIELD

The present disclosure generally relates to technical problems encountered in upgrading computer systems. More specifically, the present disclosure relates to lock-lease management of hardware and software maintenance, deployment, and optimization operations using effective application availability.

BACKGROUND

Data centers are spaces where large groupings of computer systems, and associated components, such as telecommunications and storage systems, are stored. These computer systems include not only various types of hardware (e.g., switches, routers, storage devices, servers, etc.) but also software (e.g., application instances). All of these various types of hardware and software running on a data center may collectively be known as resources.

Upgrading one or more of these resources often involves replacing and/or altering the corresponding resources in a manner that makes them inoperable for at least some period of time. When replacing a switch, for example, the old switch needs to be disconnected, rendering it inoperable, and until such time as the new switch is connected, that particular resource is unavailable. Similarly, when patching an application, while the patching is being performed, application instances corresponding to the application cannot be utilized In order to prevent these periods of inoperability from impacting performance of some aspect of the data center, the upgrades are typically scheduled to reduce the possibility of disruption to the service during the update process. While there exist software tools that aid in the scheduling process, these tools are unable to scale for large data centers. The computing needs for data centers are growing exponentially, which requires increasingly large numbers of resources to be deployed, but this creates technical problems with scheduling the upgrade processes. Highly resource-intensive efforts requiring traffic failouts are often needed to handle the most critical situations, such as massive switch upgrades, leaving non-critical updates unaddressed. However, even non-critical updates, can cause service disruption if there are enough occurring at the same time, and the odds of such conflicts grows significantly as the number of resources scales up to the tens of thousands or hundreds of thousands, as can occur in large data centers.

BRIEF DESCRIPTION OF THE DRAWINGS

Some embodiments of the technology are illustrated, by way of example and not limitation, in the figures of the accompanying drawings.

DETAILED DESCRIPTION

Overview

Figure 1:
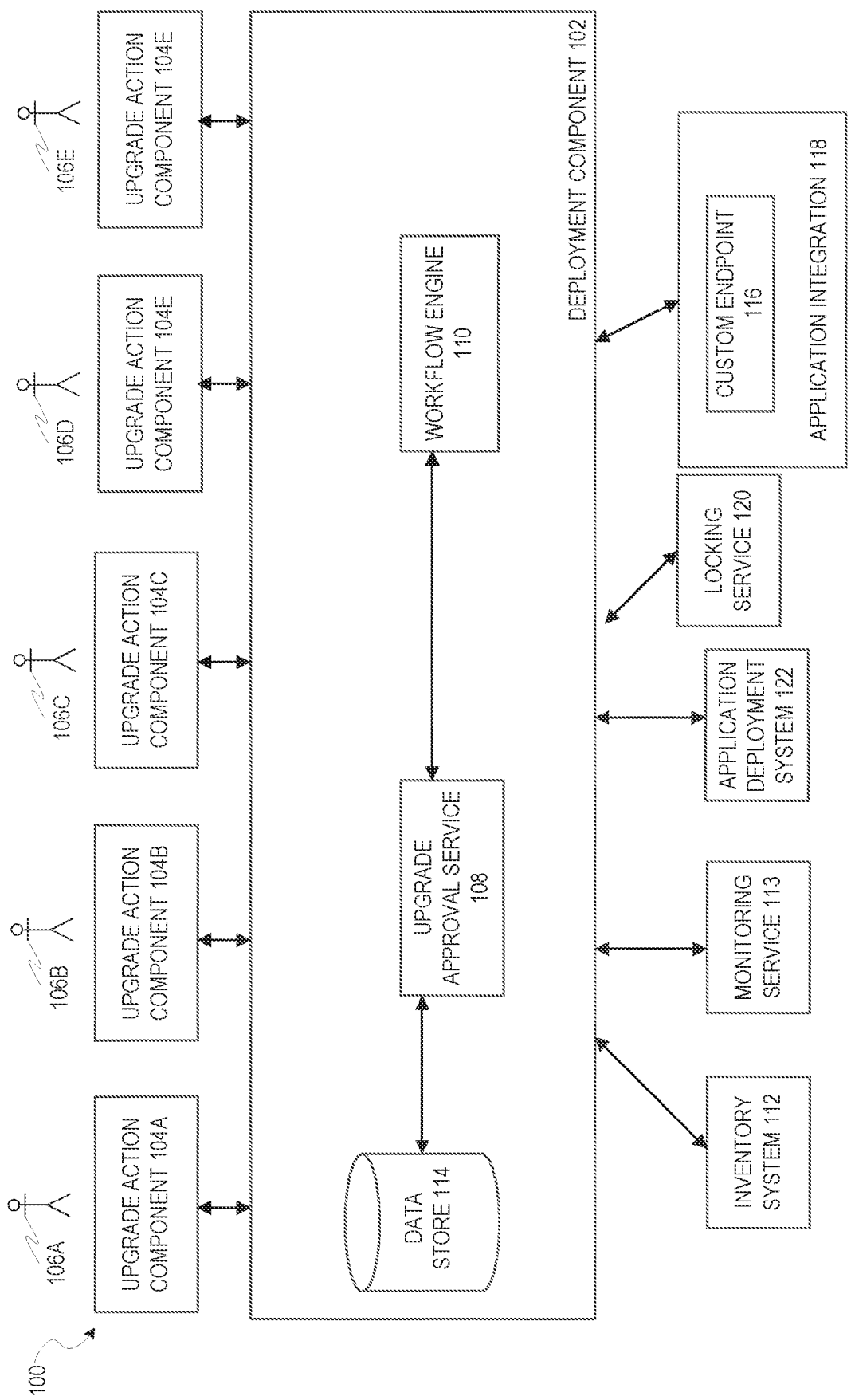
FIG. 1 is a block diagram illustrating a system in accordance with an example embodiment.

The present disclosure describes, among other things, methods, systems, and computer program products that individually provide various functionality. In the following description, for purposes of explanation, numerous specific details are set forth in order to provide a thorough understanding of the various aspects of different embodiments of the present disclosure. It will be evident, however, to one skilled in the art, that the present disclosure may be practiced without all of the specific details.

In an example embodiment, a platform and framework for simultaneous and safe execution of data center hardware and application maintenance, deployment, and optimization operations is provided. This platform and framework allows for these operations to be performed at scale, without client disruption or traffic shifts. It also allows for application deployment to be performed across multiple clusters in each fabric interleaved with switch/host maintenance operations.

In an example embodiment, the concept of effective application availability is introduced. In a data center, there may be a minimum amount of a particular resource that is needed to continue proper functioning of an application. This may be termed a safe application availability limit. The safe application availability limit may be obtained or determined using a safe application availability limit rule, which is a rule defining how the system obtains or determines the safe application availability limit. An effective application availability may be calculated by taking a current application availability and subtracting from it an availability loss from a requested upgrade operation. The effective application availability may then be compared to the safe application availability limit in order to determine whether to permit the upgrade operation to be performed at the requested time, or whether to request that the upgrade operation be attempted again at some later time.

To aid in this functionality, a lock-lease approach is utilized. A temporary lock on allocated resources is initiated when an upgrade operation is begun, and the resources allocated for the upgrade operation are subtracted from the current application availability (and hence also from the effective application availability) for the extent of the lease time for the lock. This acts to not only prevent another upgrade operation from being performed during the operation of the earlier upgrade if there aren't enough available resources to handle both, but also provides a time that can be recommended to the entity requesting the additional upgrade operation. For example, if a first upgrade operation has locked a certain number of resources until Tuesday at 10AM, and there are not enough resources to perform a second upgrade operation while the first upgrade operation is being performed, then in response to a request for the second upgrade operation to be performed while the first upgrade operation is being performed, the framework will decline the request but suggest that the request be attempted again on Tuesday at 10AM, when presumably the resources will be available (or at least are likely to be available) to grant the request then.

Additionally, in an example embodiment, a framework is provided that distinguishes between stateless applications and stateful applications. Stateless applications may be handled using an external safe application availability limit rule, whereas stateful applications may be handled using an internal safe application availability limit rule. External in this context means that the safe application availability limit rule is stored outside of the application itself, whereas internal means that the safe application availability limit rule is stored inside the application. As such, when the framework is determining whether to allow an upgrade operation to being when that upgrade operation impacts a stateless application, the safe application availability limit is obtained using the external rule, whereas when the framework is determining whether to allow an upgrade operation that impacts a stateful application to begin, the safe application availability limit is obtained using the internal rule. External rules may be specified with the framework itself by the application owner, whereas internal rules are defined by application developers using a custom endpoint that can be called by the framework. The choice between internal or external rules depends upon whether the application is stateful or stateless.

The result is a framework that can scale easily and while reducing the possibility that resource upgrades can cause application failures or other problems, due to insufficient resources being available to handle unforeseen outages.

Description

In an example embodiment, a platform and framework for simultaneous and safe execution of data center hardware and application maintenance, deployment, and optimization operations is provided. It should be noted that while the present disclosure describes the use of various features and operations within the context of a physical data center, nothing in this document shall be read as limiting the scope of protection to only physical data centers, as the features and operations are equally applicable to cloud environments.

FIG. 1 is a block diagram illustrating a system 100 in accordance with an example embodiment. The system 100 includes a deployment component 102 that generally acts to control deployment of upgrades to resources in a data structure. The deployment component 102 receives requests to perform (or schedule) upgrades from different types of upgrade action components 104A-104E, which are controlled by administrators/operators 106A-106E. Each upgrade action component 104A-104E may specify a resource upgrade that will affect availability of one or more applications controlled by the deployment component 102. Notably, while five upgrade action components 104A-104E are depicted here, there may be any number of different upgrade action components 104A-104E to request any number of different upgrades. Examples include planned switch upgrades/maintenance impacting stateless applications, planned host operating system (OS) upgrades impacting stateless applications, planned switch upgrades/maintenance impacting stateful applications, planned host operating system (OS) upgrades impacting stateful applications, planned heterogeneous datacenter maintenance impacting stateless applications, planned heterogeneous datacenter maintenance impacting stateful applications, stateless application deployment synchronization with switch upgrade/maintenance, stateless application deployment synchronization with host OS upgrade/maintenance, stateful application deployment synchronization with switch upgrade/maintenance, stateful application deployment synchronization with host OS upgrade/maintenance, application metadata/state distribution, application cluster expansion or shrinkage, application healing, prioritization ordering between different planned maintenance operations, and unplanned maintenance that needs to be performed immediately. It should be noted that while this figure depicts the use of various features by administrators/operators 106A-106E, these features can also be invoked by a machine actor such as another automated system, rather than a human.

The deployment component 102 may contain an upgrade approval service 108 and a workflow engine 110. The upgrade approval service 108 determines whether to approve or reject an upgrade request. In an example embodiment, the upgrade approval service 108 will also provide a suggested reattempt time if it is rejecting an upgrade request.

As described earlier, in an example embodiment, the concept of effective application availability is introduced. The upgrade approval service 108 calculates this effective application availability and compares it to a safe application availability limit, for any application affected by the upgrade being requested. An effective application availability may be calculated by taking a current application availability and subtracting from it an availability loss from a requested upgrade operation. The effective application availability may then be compared to the safe application availability limit in order to determine whether to permit the upgrade operation to be performed at the requested time, or whether to request that the upgrade operation be attempted again at some later time.

The current application availability may be determined at least partially using information from an inventory system 112. The inventory system 112 tracks which hosts an application is running on. The upgrade approval service 108 uses this information in two ways. First, it uses the information to determine which applications may be affected by the requested upgrade. For example, if the requested upgrade is a request to upgrade switch B, then the upgrade approval service 108 may query the inventory system 112 to determine which application(s) is/are using switch B, to arrive at a list of application(s) that may be affected if switch B goes offline during the upgrade operation. Additionally, since the information includes not only the applications that are affected but the number of application instances that are affected (e.g., how many application instances of an application are currently running on switch B), the upgrade approval service 108 may further use this information to calculate the availability loss from the requested upgrade. Second, it uses the information to determine where to send queries regarding current availability. For example, the information may indicate that a monitoring node for the application is found at a particular location, which allows the upgrade approval service 108 to query that particular location to determine current application availability. Such a monitoring node may, for example, track how many instances of the application have been deployed, how many are currently in-use, how many are currently idle, and how many are current inaccessible or not operational.

Thus, from the above information, the upgrade approval service 108 is able to compute a difference between a current application availability and an availability loss from the requested upgrade.

Stateless application availability usually can be determined by the number of application host instances that are healthy, such as by using a health check using a monitoring service 113. Healthy application host instances can also be used for availability tracking of some stateful applications, where a new application host instance can be created and made operational quickly, such as within minutes, as opposed to requiring hours or days to copy over needed state information to the new application host instance or requiring changes to network access control lists (ACLs), which can take time to propagate through an infrastructure.

For many stateful applications, however, more complicated availability calculations may be needed, factoring in application resource sharding and replication policies. For example, Kafka™ topic partition replication factor and number of in-sync replicas need to be examined to ensure that there is always a minimum number of replications of any topic partitions available. In another example, an application maintains clusters that are exact duplicates, and it can also permit one or two of N clusters to be impacted at any given point in time.

Another possible technique is to create additional application host instances/application resource instances in advance, which temporarily increases the availability of the application.

It should be noted that it may be desirable to build into the framework a minimum amount of headroom to allow for unplanned failures, such as an application crash or bad disk. As a general principle, this may include allowing for at least one instance of the application to be an unplanned failure. The exact level of this minimum may be set to any amount by an application owner, based on the degree of comfort the application owner has in allowing application instances to fail without impacting application performance, but in an example embodiment it is set to one instance. It should also be noted that, as will be described in more detail later, there is no requirement that this limit be static - it can be variable and can be changed at any time by the application owner. Indeed, the limit may also be different for different applications, application types, industries, resource types, etc. Further, machine learning may be utilized to learn this limit rather than have it be explicitly set by an application owner or other individual.

The machine learning algorithm used for machine learning may be selected from among many different potential supervised or unsupervised machine learning algorithms. Examples of supervised learning algorithms include artificial neural networks, Bayesian networks, instance-based learning, support vector machines, random forests, linear classifiers, quadratic classifiers, k-nearest neighbor, decision trees, and hidden Markov models. Examples of unsupervised learning algorithms include expectation-maximization algorithms, vector quantization, and information bottleneck methods.

The machine learning algorithm is used to train a machine learned model to learn the unplanned limit failure. This is performed by feeding training data into the machine learning algorithm, with the machine learning algorithm using the training data to learn weights assigned to feature data within the training data. A loss function may be evaluated at each of a number of iterations of the training process, with each iteration changing one or more of the weights and reevaluating the loss function. Once the loss function is minimized, the weights have been learned, and the weights are used to construct the model. The model represents a formula that includes, for each potential feature that is relevant to the model, a learned weight. At evaluation time, the model is used to score a piece of input data by extracting feature values for each of the potential features that are relevant (at least to the extent that these features are found in he input data), and then multiplying each feature value by its corresponding learned weights. The products of the weights and feature values can then be summed into a score.

At a later time, either new training data or feedback (or both) can be used to retrain the model, causing a change in the learned weights. The feedback could include user feedback, or simply system feedback, such as indications that application failure occurred.

In an example embodiment, the training data includes information about systems that have operated in the past (such as performance metrics, like CPU processing power, memory availability and speed, number of nodes, etc.) and a label assigned to each grouping of such data that indicates whether an unplanned failure occurred and how many such unplanned failures occurred simultaneously. The machine learning process then learns which factors are predictive of a high degree of unplanned failures, thus allowing the model to determine an outer safe limit for a particular system based on that particular system's information.

In another example embodiment, application-level metrics, such as request queue length, response latency, and throughput may be used, in lieu of or in addition to the above-described infrastructure metrics.

Additionally, the minimum limit of headroom may be accounted for by the upgrade approval service 108 in a number of ways. In one example embodiment, it may be used to reduce the current application availability when performing the difference operations described above. In other words, rather than merely subtracting the availability loss from the requested upgrade from the current application availability, the upgrade approval service 108 may subtract both the availability loss from the requested upgrade and the minimum limit of headroom from the current application availability. In another example embodiment, the minimum limit of headroom is included in the safe application availability limit.

It should also be noted that the current application availability takes into account any locks provided for other upgrade requests that have already been granted, at least for the amount of time that the lock(s) are leased for. This will be described in more detail below when discussing lock-leases, but generally any time an upgrade request is granted, the resources determined as availability loss(es) from previously granted upgrade requests will have been locked and thus will be subtracted from the current application availability.

Regardless, in order to determine whether to approve the requested upgrade, the upgrade approval service 108 compares the computed difference to the safe application availability limit. It then allows the requested upgrade if the computed difference is greater than or equal to the safe application availability limit, and rejects it if the computed difference is less than the safe application availability limit.

Determination of the safe application availability limit differs based on whether the requested upgrade affects a stateless or a stateful application. For stateless applications, the safe application availability limit may be stored "externally", such as in data store 114. For stateful applications, the safe application availability limits may be determined by accessing a custom endpoint 116 "internal" to the application. External in this context means that the safe application availability limit rule is stored outside of the application itself, whereas internal means that the safe application availability limit rule is stored inside the application, or within software that is closely integrated with the application, such as application integration 118. As such, when the upgrade approval service 108 is determining whether to allow an upgrade operation that impacts a stateless application to begin, the safe application availability limit is obtained using the external rule from the data store 114, whereas when the upgrade approval service is determining whether to allow an upgrade operation that impacts a stateful application to begin, the safe application availability limit is obtained using the internal rule utilized by the custom endpoint 116. External rules may be specified with the upgrade approval service 108 itself by the application owner, whereas internal rules are defined by application developers using a custom endpoint 116 that can be called by the upgrade approval service 108.

The safe application availability limit rule describes how a safe application availability limit is determined. For external rules, the rule may be static and may define an application instance limit explicitly (e.g., minimum of 8 application instances need to be available) or through a calculation (e.g., minimum 80% of instantiated application instances need to be available). For internal rules, the custom endpoint may describe a more complex operation needed to define an application instance limit, as determined by the creator of the application. This limit may be dynamic, in that it may change based on current system and/or application conditions.

Stateless application handling can be divided into two categories, for the purpose of determining maintenance operations synchronization handling: ephemeral and sticky. Ephemeral applications are applications that can be migrated to hosts that are outside the blast radius of the infrastructure maintenance operation, such as in the case of a top-of-rack (TOR) switch upgrade, migrating the application to a server in a rack connected to a different TOR switch. Blast radius refers to the hardware and software components potentially adversely affected by an operation. For such applications, the upgrade approval service 108 may ensure that the application is instantiated and activated elsewhere, before approving the requested maintenance operations. Thus, in these instances, it may not be necessary to perform the application safe availability check.

Sticky applications require that applications remain in place during upgrade. Reasons for this include that the time for the maintenance operation is much less than the time required to instantiate and activate the application instance elsewhere, such as where network ACL modifications are needed, specialized requirements are not readily available such as hardware (need non-volatile memory, GPU), lack of shared storage, dependency on another co-located application, etc., and constrained server capacity in the physical location to allow application instance migration.

Thus, in some example embodiments, the ephemeral applications may deploy additional instances, effectively ensuring that the application safe availability check will pass.

When the upgrade approval service 108 determines that a requested upgrade is approved, the incremental availability loss from the requested upgrade operation is explicitly tracked. Doing so helps prevent issues where an ordinary application health check may only intermittently pass, such as where during switch maintenance the switch ports are not actually administratively shut down and thus might appear to be active during a health check.

The tracking can be achieved by using a lock-lease. This involves recording the impacted application host instances for data center infrastructure operations such as switch upgrades, host maintenance, etc., for both stateless and stateful applications. Stateless applications may have simpler maintenance operations such as starting/stopping/adding application host instances, and so tracking impacted application host instances for an allowed upgrade works for application maintenance operations too. For stateful applications, one factors in the sharding/replication loss of application resources from the impacted application host instances either due to unplanned failures or due to in-progress maintenance operations. Each of these locks also comes with a lease, meaning that the lock is temporary and for a defined duration. This duration may be set base on the request itself, which may, for example, explicitly indicate the duration that the upgrade operation will take.

This acts to not only prevent another upgrade operation from being performed during the operation of the earlier upgrade if there aren't enough available resources to handle both, but also provides a time that can be recommended to the entity requesting the additional upgrade operation. For example, if a first upgrade operation has locked a certain number of resources until Tuesday at 10AM, and there are not enough resources to perform a second upgrade operation while the first upgrade operation is being performed, then in response to a request for the second upgrade operation to be performed while the first upgrade operation is being performed, the framework will decline the request but suggest that the request be attempted again at Tuesday at 10AM, when presumably the resources will be available (or at least are likely to be available) to grant the request then.

It should be noted that while the upgrade approval service 108 may use the lease lock to recommend to the requester a recommended time/date to make the request again, it need not automatically unlock the reserved application instances at that time, or at least need not automatically grant the new request. Rather, it may be prudent for the upgrade approval service 108 to query the monitoring service 113 to determine whether the upgrade was successful and whether the affected application instances are indeed now available and operational. This helps prevent a scenario where a lock-lease has expired but the upgrade that was occurring during the lock-lease has failed or caused a system crash, making the corresponding application instances unavailable for subsequent request, even though the upgrade approval service 108 (though the corresponding application instances) would have been available for the subsequent request if it was made earlier.

The actual locking, while requested by the upgrade approval service 108, may be performed by a locking service 120. The locking service allows clients to request and release locks, as well as to query existing locks.

The actual upgrade operations may be performed by the workflow engine 110, which requests upgrade requests, secures approval from the upgrade approval service 108 and, on approval, executes the upgrade operation(s). It may provide a pre-hook (default or custom) for preparing the application cluster before execution of maintenance operations as well as a post-hook (default or custom) for full restoration of the application and release of any acquired locks by calling the upgrade approval service 108. It may also access an application deployment system 122, which is used to start/stop applications that are part of various infrastructure and application maintenance operations. In addition, the application deployment system 122 can be a driver of maintenance activity for application deployment. As such, it can interact with the upgrade approval service 108 to ensure it is safe to take an application host instance down for deploying upgraded software and/or configurations.

Figure 2:
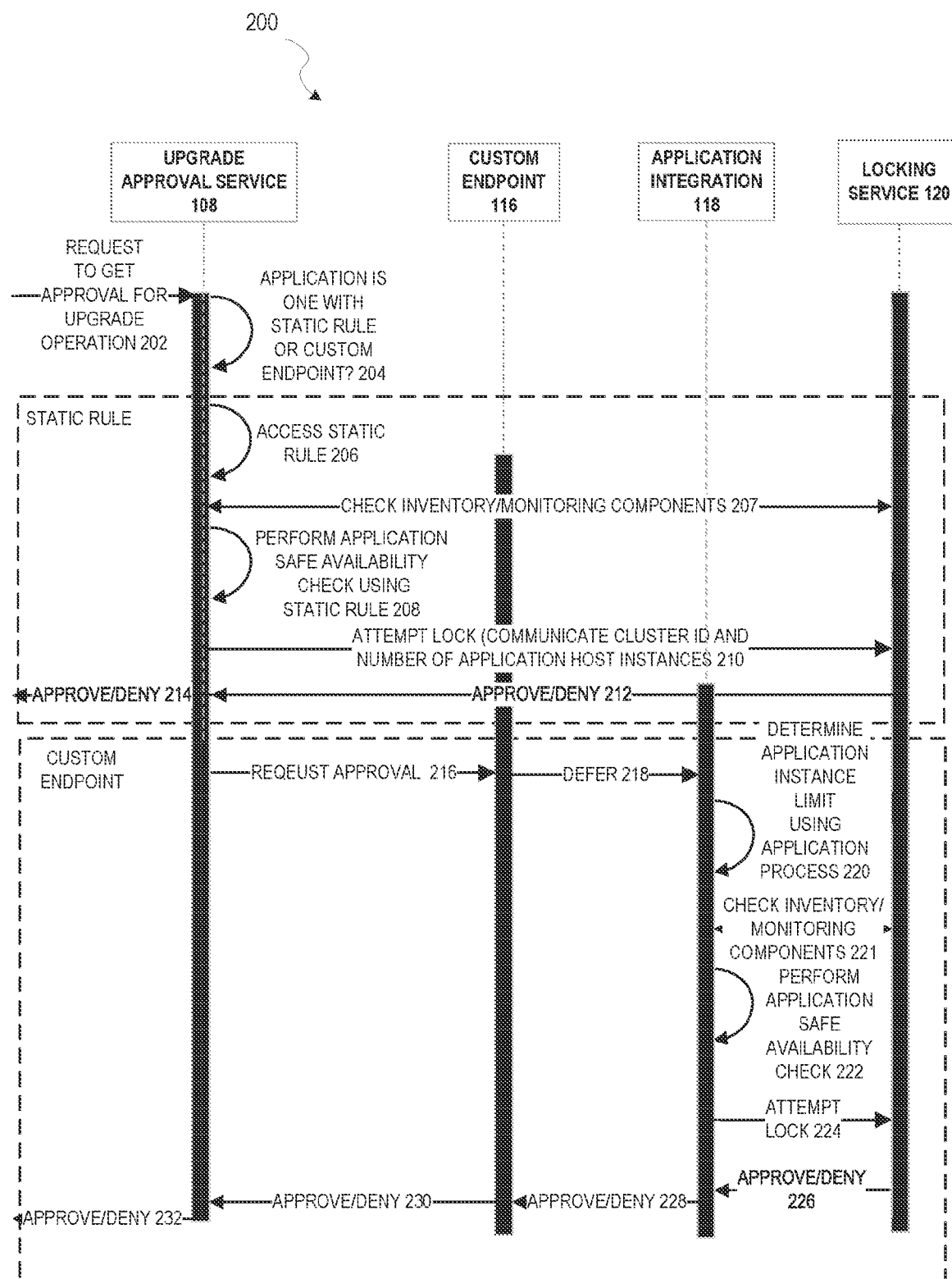
FIG. 2 is a sequence diagram illustrating a method for performing an application safe availability check, in accordance with an example embodiment.

FIG. 2 is a sequence diagram illustrating a method 200 for performing an application safe availability check, in accordance with an example embodiment. This method 200 utilizes an upgrade approval service 108, a custom endpoint 116, application integration 118, and a locking service 120. At operation 202, the upgrade approval service 108 receives a request to get approval for performing an upgrade operation that impacts an application. At operation 204, it is determined if the application is one with a static rule or one with a custom endpoint. In some example embodiments, this may include determining whether the app is a sticky stateless application (static rule) or a stateful application (custom endpoint).

If the application is one with a static rule, then at operation 206 the static rule for the application is accessed. At operation 207, inventory and monitoring components are checked. At operation 208, an application safe availability check is performed using the static rule. As described earlier, the static rule may define an application instance limit explicitly (e.g., minimum of 8 application instances need to be available) or through a calculation (e.g., minimum 80% of instantiated application instances need to be available).

The static rule is used to determine the application instance limit, which can be compared to an effective application availability (the difference between a current application availability and an availability loss from a requested upgrade operation). If the effective application availability meets or exceeds the application instance limit, then at operation 210 a lock is attempted by communicating a cluster identification and a number of application host instances to the locking service 120. If the lock is successful, at operation 212 the locking service 120 will inform the upgrade approval service 108, which at operation 214 will communicate the approval of the requested upgrade operation. If a lock is unsuccessful, or if the application safe availability check fails, then at operation 214 the upgrade approval service 108 will communicate the denial of the requested upgrade operation.

If the application is one with a custom endpoint, then at operation 216 the upgrade approval service 108 requests approval from the custom endpoint 116. At operation 218, the custom endpoint defers the approval process to the application integration 118. At operation 220, the application integration 118 determines the application instance limit using a process defined by the application, which may include, for example, factoring in application-specific custom partitioning information from the application integration 118. At operation 221, inventory and monitoring components are checked. At operation 222, the application integration 118 performs the application safe availability check in a similar manner as it is performed in operation 208. Here, though, he inventory and monitoring component information, both at the application and sub-application (sharded resource) level, are used to perform this check.

If the effective application availability meets or exceeds the application instance limit, then at operation 224 a lock is attempted by communicating a cluster identification and a number of application host instances to the locking service 120. At operation 226 the locking service 120 will inform the application integration 118 of the approval or denial of the lock, which at operation 228 will communicate that fact to the custom endpoint 116, which at operation 230 will communicate that fact to the upgrade approval service 108. Then at operation 232 the upgrade approval service 108 will communicate the approval or denial of the requested upgrade operation.

It should be noted that in an alternative embodiment, in the case of an application with a custom endpoint, the application safe availability check is performed by the custom endpoint 116 or application integration 118 (rather than the upgrade approval service 108), and the result returned to the upgrade approval service 108.

Figure 3:
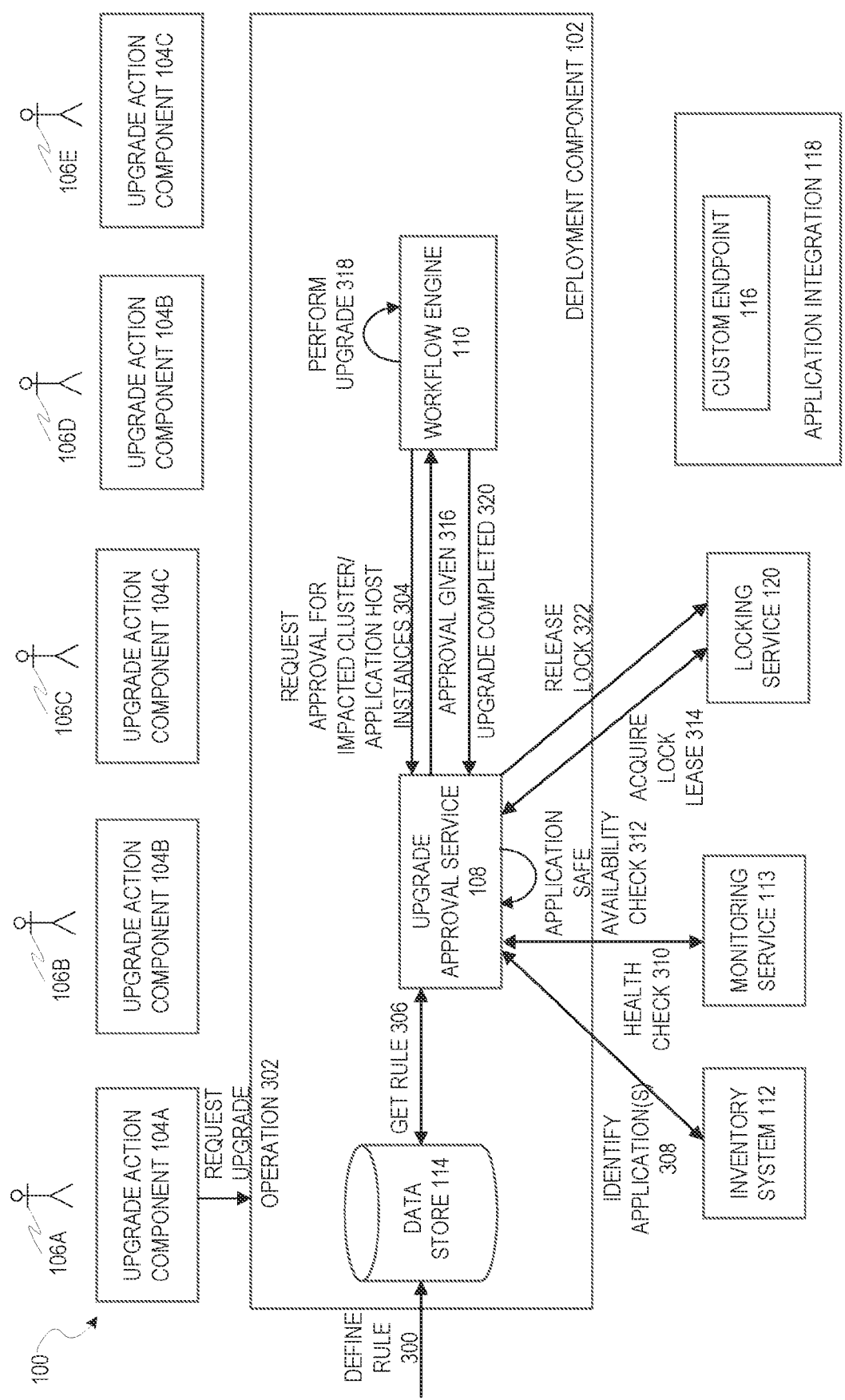
FIG. 3 is a block diagram illustrating the system of FIG. 1 along with a process flow used for cases where the application impacted by the requested upgrade operation is a stateless application, in accordance with an example embodiment.

FIG. 3 is a block diagram illustrating the system 100 of FIG. 1 along with a process flow used for cases where the application impacted by the requested upgrade operation is a stateless application, in accordance with an example embodiment. As can be seen, at operation 300, a status rule is defined and stored in data store 114. At operation 302, the upgrade action component 104A requests an upgrade operation. At operation 304, the workflow engine 110 requests approval for the impacted cluster/application host instances from the upgrade approval service 108. At operation 306, the upgrade approval service 108 gets the rule from the data store 114.

At operation 308, impacted applications are identified at the inventory system 112. A health check is performed at the monitoring service 113 at operation 310. Then an application safe availability check is performed at the upgrade approval service at operation 312. Assuming the application safe availability check is passed, then at operation 314 a lock lease is acquired from the locking service 120. At operation 316, approval is given to the workflow engine 110 to begin the upgrade.

Figure 4:
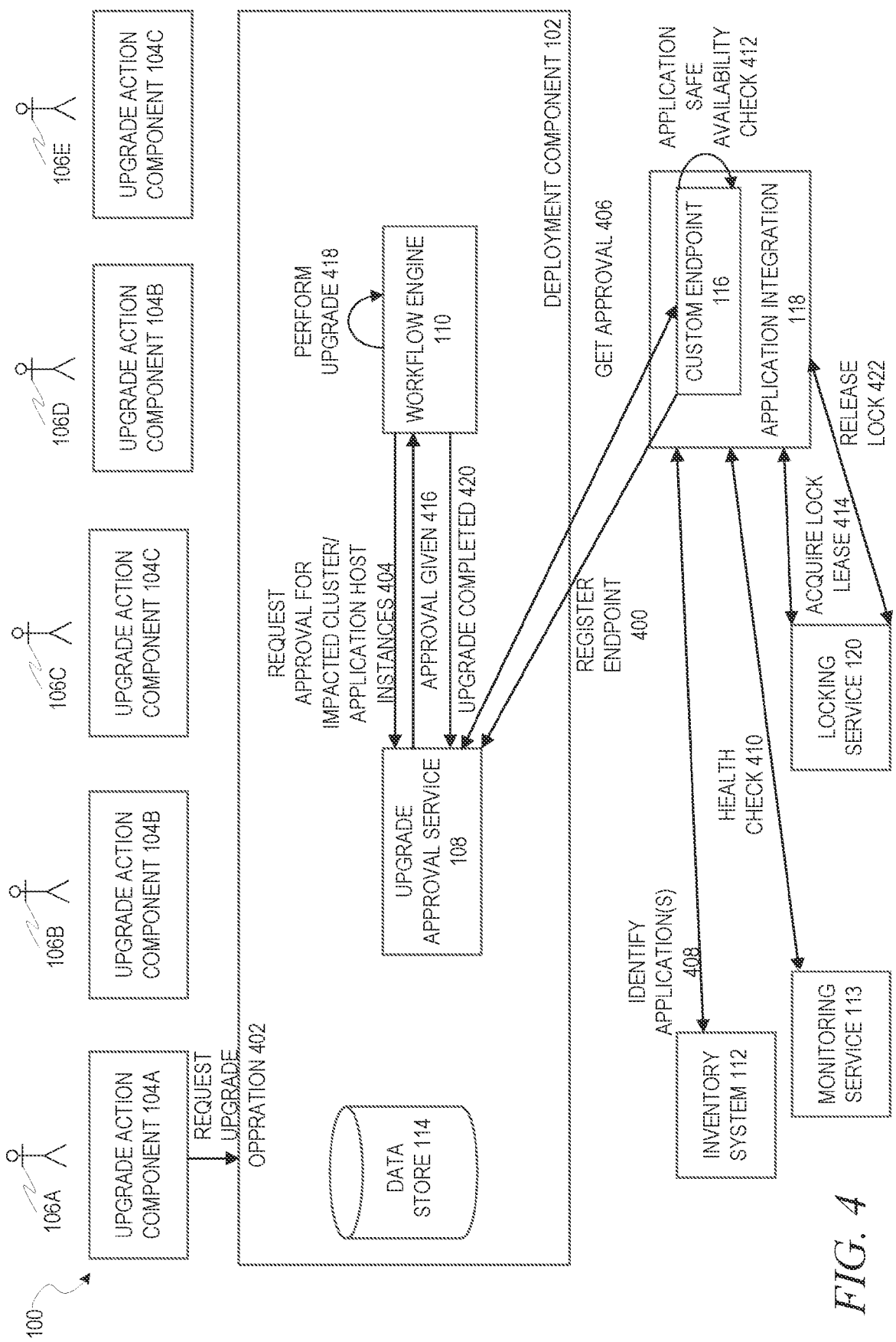
FIG. 4 is a block diagram illustrating the system of FIG. 1 along with a process flow used for cases where the application impacted by the requested upgrade operation is a stateful application, in accordance with an example embodiment.

At operation 318, the workflow engine 110 performs the upgrade. Then at operation 320, the workflow engine 110 informs the upgrade approval service 108 that the upgrade is complete. At operation 322, the lock is then released. FIG. 4 is a block diagram illustrating the system 100 of FIG. 1 along with a process flow used for cases where the application impacted by the requested upgrade operation is a stateful application, in accordance with an example embodiment. As can be seen, at operation 400, a custom endpoint is registered with the upgrade approval service 108. At operation 402, the upgrade action component 104A requests an upgrade operation. At operation 404, the workflow engine 110 requests approval for the impacted cluster/application host instances from the upgrade approval service 108.

At operation 406, the upgrade approval service 108 requests approval from the custom endpoint 116. At operation 408, impacted applications are identified at the inventory system 112. A health check is performed at the monitoring service 113 at operation 410. Then an application safe availability check is performed at the upgrade approval service 108 at operation 412. Assuming the application safe availability check is passed, then at operation 414 a lock lease is acquired from the locking service 120. At operation 416, approval is given to the workflow engine 110 to begin the upgrade.

At operation 418, the workflow engine 110 performs the upgrade. Then at operation 420, the workflow engine 110 informs the upgrade approval service 108 that the upgrade is complete. At operation 422, the lock is then released.

The above design exposes multiple lock context/IDs to the upgrade approval service 108, and the upgrade approval service 108 is then responsible for persisting these and ensuring that it issues unlock requests for each of these lock IDs upon completion of the operation. Furthermore, in cases where locks happen en masse, the release still happens as each deployment completes, and thus the upgrade approval service 108 still must manage the mapping of lock IDs to application host instances and use the correct lock ID for each unlock. Otherwise, it needs to specify an entire list in an unlock request for a specific instance, but this creates additional work in the upgrade approval process layers to scan through each of these locks to ignore any lock IDs that are no longer current. This makes it further difficult to discern situations where the upgrade approval service 108 did not present the correct lock identification due to other issues.

In an example embodiment, rather than returning multiple locks to the upgrade approval service 108, a lock set is returned. The upgrade approval service 108 still needs to store a lock set ID, but this is much easier than storing every single lock ID. In case of errors, it is also much easier to unwind the issues via logs because there are fewer entities to track down.

A lock set is a container of multiple locks. The lock set has its own unique ID. The lock set contains all lock IDs and any additional lock metadata can be retrieved by looking up a lock ID in a lookup table.

A lock set in general can potentially contain locks of different clusters and/or locks of different lock scope types. However, by using a lock set with a set of constraints, there can be an appropriate balance between accomplishing the goals of the lock set while preserving the additional flexibility to add capabilities and generalization in the future.

These constraints may include: requiring that the lock set contain homogeneous locks (locks of the same lock scope type) and requiring that the lock set contains locks with the same parent lock scope. (Assuming a lock's scope is an N tuple, all the locks in the lock set have the same values for the n-1 ancestral nodes in the type, with the only variance being the N′th tuple value, e.g., a cluster-level lock set can only contain application host instance locks for a single cluster).

Using a lock set per cluster also allows for easier delegation management, which allows delegation scope to an application cluster. If the lock set contains locks that span multiple clusters, then the delegate that acts for one application cluster can also have the ability to act on another application cluster. Using a cluster scoped lock set removes this concern.

Figure 5:
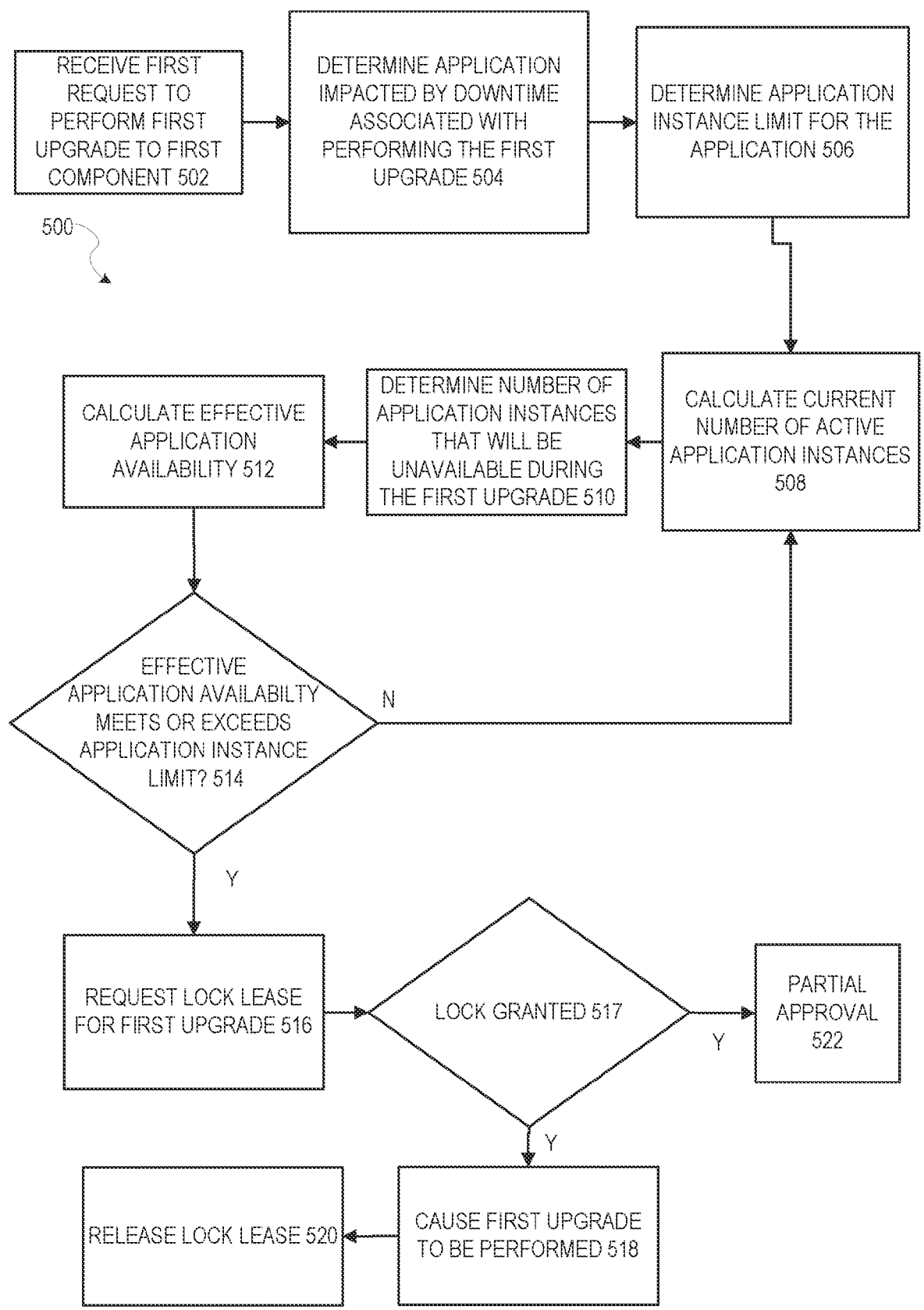
FIG. 5 is a flow diagram illustrating a method in accordance with an example embodiment.

FIG. 5 is a flow diagram illustrating a method 500 in accordance with an example embodiment. At operation 502, a first request to perform a first upgrade to a first component of a computer system is received. At operation 504, an application impacted by a downtime associated with performing the first upgrade is determined. At operation 506, an application instance limit for the application is determined, the application instance limit indicating a minimum number of active application instances of the application.

At operation 508, a current number of active application instances is calculated. At operation 510, a number of active application instances that will be unavailable during the first upgrade is determined. At operation 512, an effective application availability is calculated by subtracting the number of active application instances that will be unavailable during the first upgrade from the current number of active application instances.

At operation 514, it is determined whether the effective application availability meets or exceeds the application instance limit. It should be noted that in the case of stateful applications, this determination is not as simple as merely a meeting or exceeding application instances limit. Rather, this is performed by factoring in the application sharding/partitioning and replication. Nevertheless, if the limit is not met or exceeded, then the method 500 loops back to operation 508 until it does.

Once it does, at operation 516, a request for a lock lease for the first upgrade from a locking instance is made. The lock lease reserves the number of active application instances that will be unavailable during the first upgrade and indicates a lease period. At operation 517, it is determined if the lock has been granted. If so, then at operation 518, the first upgrade is caused to be performed. At operation 520, after completion of the first upgrade, the lock lease is released. If at operation 517 it is determined that the lock has not been granted, then at operation 522 partial approval is granted. How the system handles partial approval is dependent upon the requester. The requester may specify that partial approval is sufficient. If that is the case, then the partial approval at operation 522 may be sent to the requester. If the requester has specified that partial approval is not sufficient, then the lock may be released.

Figure 6:
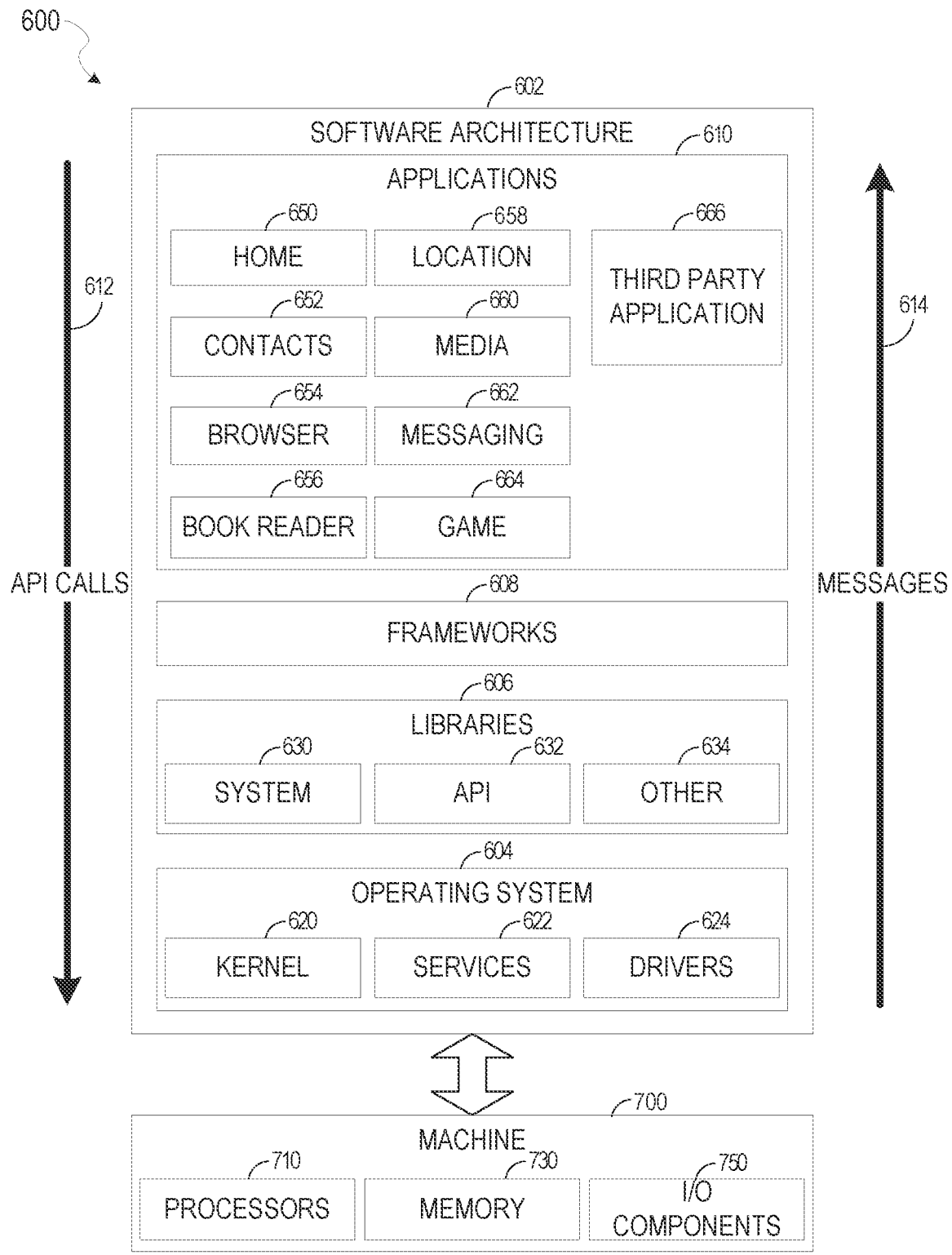
FIG. 6 is a block diagram illustrating a software architecture, in accordance with an example embodiment.

FIG. 6 is a block diagram 600 illustrating a software architecture 602, which can be installed on any one or more of the devices described above. FIG. 6 is merely a non-limiting example of a software architecture, and it will be appreciated that many other architectures can be implemented to facilitate the functionality described herein. In various embodiments, the software architecture 602 is implemented by hardware such as a machine 700 of FIG. 7 that includes processors 710, memory 730, and input/output (I/O) components 750. In this example architecture, the software architecture 602 can be conceptualized as a stack of layers where each layer may provide a particular functionality. For example, the software architecture 602 includes layers such as an operating system 604, libraries 606, frameworks 608, and applications 610. Operationally, the applications 610 invoke API calls 612 through the software stack and receive messages 614 in response to the API calls 612, consistent with some embodiments.

In various implementations, the operating system 604 manages hardware resources and provides common services. The operating system 604 includes, for example, a kernel 620, services 622, and drivers 624. The kernel 620 acts as an abstraction layer between the hardware and the other software layers, consistent with some embodiments. For example, the kernel 620 provides memory management, processor management (e.g., scheduling), component management, networking, and security settings, among other functionality. The services 622 can provide other common services for the other software layers. The drivers 624 are responsible for controlling or interfacing with the underlying hardware, according to some embodiments. For instance, the drivers 624 can include display drivers, camera drivers, BLUETOOTH® or BLUETOOTH® Low Energy drivers, flash memory drivers, serial communication drivers (e.g., Universal Serial Bus (USB) drivers), Wi-Fi® drivers, audio drivers, power management drivers, and so forth.

In some embodiments, the libraries 606 provide a low-level common infrastructure utilized by the applications 610. The libraries 606 can include system libraries 630 (e.g., C standard library) that can provide functions such as memory allocation functions, string manipulation functions, mathematic functions, and the like. In addition, the libraries 606 can include API libraries 632 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 606 can also include a wide variety of other libraries 634 to provide many other APIs to the applications 610.

The frameworks 608 provide a high-level common infrastructure that can be utilized by the applications 610, according to some embodiments. For example, the frameworks 608 provide various graphical user interface functions, high-level resource management, high-level location services, and so forth. The frameworks 608 can provide a broad spectrum of other APIs that can be utilized by the applications 610, some of which may be specific to a particular operating system 604 or platform.

In an example embodiment, the applications 610 include a home application 650, a contacts application 652, a browser application 654, a book reader application 656, a location application 658, a media application 660, a messaging application 662, a game application 664, and a broad assortment of other applications, such as a third-party application 666. According to some embodiments, the applications 610 are programs that execute functions defined in the programs. Various programming languages can be employed to create one or more of the applications 610, structured in a variety of manners, such as object-oriented programming languages (e.g., Objective-C, Java, or C++) or procedural programming languages (e.g., C or assembly language). In a specific example, the third-party application 666 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 666 can invoke the API calls 612 provided by the operating system 604 to facilitate functionality described herein.

Figure 7:
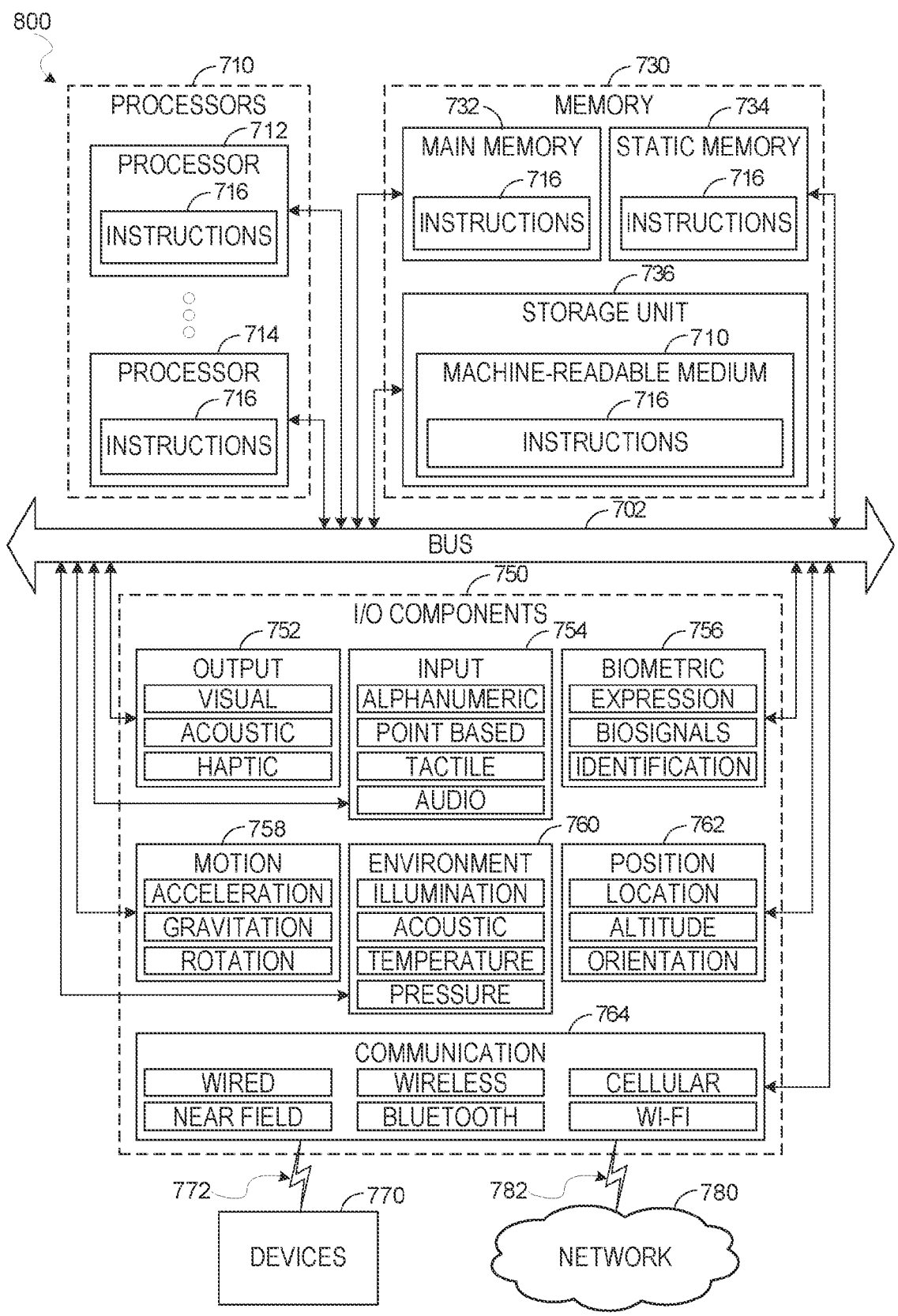
FIG. 7 illustrates a diagrammatic representation of a machine in the form of a computer system within which a set of instructions may be executed for causing the machine to perform any one or more of the methodologies discussed herein, according to an example embodiment.

FIG. 7 illustrates a diagrammatic representation of a machine 700 in the form of a computer system within which a set of instructions may be executed for causing the machine 700 to perform any one or more of the methodologies discussed herein, according to an example embodiment. Specifically, FIG. 7 shows a diagrammatic representation of the machine 700 in the example form of a computer system, within which instructions 716 (e.g., software, a program, an application 610, an applet, an app, or other executable code) for causing the machine 700 to perform any one or more of the methodologies discussed herein may be executed. For example, the instructions 716 may cause the machine 700 to execute the method 600 of FIG. 6. Additionally, or alternatively, the instructions 716 may implement FIGS. 1-6, and so forth. The instructions 716 transform the general, non-programmed machine 700 into a particular machine 700 programmed to carry out the described and illustrated functions in the manner described. In alternative embodiments, the machine 700 operates as a standalone device or may be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 may comprise, but not be limited to, a server computer, a client computer, a PC, a tablet computer, a laptop computer, a netbook, a set-top box (STB), a portable digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 may include processors 710, memory 730, and I/O components 750, which may be configured to communicate with each other such as via a bus 702. In an example embodiment, the processors 710 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 712 and a processor 714 that may execute the instructions 716. The term "processor" is intended to include multi-core processors 710 that may comprise two or more independent processors 712 (sometimes referred to as "cores") that may execute instructions 716 contemporaneously. Although FIG. 7 shows multiple processors 710, the machine 700 may include a single processor 712 with a single core, a single processor 712 with multiple cores (e.g., a multi-core processor), multiple processors 710 with a single core, multiple processors 710 with multiple cores, or any combination thereof.

The memory 730 may include a main memory 732, a static memory 734, and a storage unit 736, all accessible to the processors 710 such as via the bus 702. The main memory 732, the static memory 734, and the storage unit 736 store the instructions 716 embodying any one or more of the methodologies or functions described herein. The instructions 716 may also reside, completely or partially, within the main memory 732, within the static memory 734, within the storage unit 736, within at least one of the processors 710 (e.g., within the processor's cache memory), or any suitable combination thereof, during execution thereof by the machine 700.

The I/O components 750 may include a wide variety of components to receive input, provide output, produce output, transmit information, exchange information, capture measurements, and so on. The specific I/O components 750 that are included in a particular machine 700 will depend on the type of machine 700. For example, portable machines such as mobile phones will likely include a touch input device or other such input mechanisms, while a headless server machine will likely not include such a touch input device. It will be appreciated that the I/O components 750 may include many other components that are not shown in FIG. 7. The I/O components 750 are grouped according to functionality merely for simplifying the following discussion, and the grouping is in no way limiting. In various example embodiments, the I/O components 750 may include output components 752 and input components 754. The output components 752 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 750 may include biometric components 756, motion components 758, environmental components 760, or position components 762, among a wide array of other components. For example, the biometric components 756 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 758 may include acceleration sensor components (e.g., accelerometer), gravitation sensor components, rotation sensor components (e.g., gyroscope), and so forth. The environmental components 760 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 762 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 750 may include communication components 764 operable to couple the machine 700 to a network 780 or devices 770 via a coupling 782 and a coupling 772, respectively. For example, the communication components 764 may include a network interface component or another suitable device to interface with the network 780. In further examples, the communication components 764 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 770 may be another machine or any of a wide variety of peripheral devices (e.g., a peripheral device coupled via a USB).

Moreover, the communication components 764 may detect identifiers or include components operable to detect identifiers. For example, the communication components 764 may include radio frequency identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 764, such as location via Internet Protocol (IP) geolocation, location via Wi-Fi® signal triangulation, location via detecting an NFC beacon signal that may indicate a particular location, and so forth.

Executable Instructions and Machine Storage Medium

The various memories (i.e., 730, 732, 734, and/or memory of the processor(s) 710) and/or the storage unit 736 may store one or more sets of instructions 716 and data structures (e.g., software) embodying or utilized by any one or more of the methodologies or functions described herein. These instructions (e.g., the instructions 716), when executed by the processor(s) 710, cause various operations to implement the disclosed embodiments.

As used herein, the terms "machine-storage medium," "device-storage medium," and "computer-storage medium" mean the same thing and may be used interchangeably. The terms refer to a single or multiple storage devices and/or media (e.g., a centralized or distributed database, and/or associated caches and servers) that store executable instructions 716 and/or data. The terms shall accordingly be taken to include, but not be limited to, solid-state memories, and optical and magnetic media, including memory internal or external to the processors 710. Specific examples of machine-storage media, computer-storage media, and/or device-storage media include non-volatile memory including, by way of example, semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

Transmission Medium

In various example embodiments, one or more portions of the network 780 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or another type of cellular or wireless coupling. In this example, the coupling 782 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data-transfer technology.

The instructions 716 may be transmitted or received over the network 780 using a transmission medium via a network interface device (e.g., a network interface component included in the communication components 764) and utilizing any one of a number of well-known transfer protocols (e.g., HTTP). Similarly, the instructions 716 may be transmitted or received using a transmission medium via the coupling 772 (e.g., a peer-to-peer coupling) to the devices 770. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 716 for execution by the machine 700, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

Computer-Readable Medium

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
a processor and a non-transitory computer-readable medium having instructions stored thereon, which is configured for execution by the processor, to cause the system to perform operations comprising:
a computer-readable medium having instructions stored thereon, which, when executed by a processor, cause the system to perform operations comprising:
receiving a first request to perform a first operation to a first component of a computer system;
determining an application impacted by a first downtime associated with performing the first operation;
identifying an application instance limit for the application, the application instance limit indicating a minimum number of active application instances of the application;
calculating a current number of active application instances;
determining a number of active application instances that will be unavailable during the first operation;
calculating an effective application availability by subtracting the number of active application instances that will be unavailable during the first operation from the current number of active application instances;
in response to a determination that the effective application availability meets or exceeds the application instance limit:
requesting a lock lease for the first operation from a locking instance, the lock lease reserving the number of active application instances that will be unavailable during the first operation and indicating a lease period;
causing the first operation to be performed; and
after completion of the first operation, releasing the lock lease.

2. The system of claim 1, wherein the operations further comprise:
during the performance of the first operation:
receiving a second request to perform a second operation to a second component of the computer system;
determining the application is impacted by a second downtime associated with performing the second operation;
recalculating the current number of active application instances based on the reserved number of active application instances for the first operation;
determining a number of active application instances that will be unavailable during the second operation;
calculating an updated effective application availability by subtracting the number of active application instances that will be unavailable during the second operation from the current number of active application instances; and
in response to a determination that the updated effective application availability does not meet or exceed the application instance limit:
denying the second request, the denial including recommending a time, based on the lease period, to reattempt the second request.

3. The system of claim 1, wherein the computer system is a data center.

4. The system of claim 3, wherein the first component is a hardware switch, and the application impacted by a downtime is an application with active instances that are using the hardware switch.

5. The system of claim 1, wherein the operations further comprise:
in response to a determination that the application is a sticky stateless application, identifying the application instance limit for the application by retrieving a defined rule stored in a data store, and applying the defined rule.

6. The system of claim 1, wherein the operations further comprise:
in response to a determination that the application is a stateful application, requesting the application instance limit from a registered custom endpoint associated with the application.

7. The system of claim 6, wherein the requesting includes sending a proxy approval request.

8. The system of claim 1, wherein the current number of active application instances is reduced by a minimum amount of headroom available for unplanned failures.

9. The system of claim 2, wherein the operations further comprise:

once the lease period has expired, determining if the reserved number of active application instances are all now available; and in response to a determination that the reserved number of active application instances are not all now available, denying a reattempt of the second request to perform the second operation to the second component of the computer system despite a current time being later than the previously recommended time to reattempt the second request.

10. The system of claim 8, wherein the minimum amount of headroom available for unplanned failures is output by a machine learned model trained by a machine learning algorithm to learn the minimum amount of headroom available for unplanned failures based on one or more application features input to the machine learned model.

11. The system of claim 10, wherein the training comprises:
accessing training data, the training data comprising, for a plurality of different applications, one or more features of the corresponding application and a corresponding label indicative of a minimum amount of headroom available for unplanned failures for the corresponding application; and
feeding the training data into the machine learning algorithm to learn weights assigned to the one or more features.

12. The system of claim 1, wherein the machine learned model is retrained based on data received about unplanned failures causing failure of the application.

13. The system of claim 1, wherein the requesting a lock lease includes requesting a plurality of lock leases all at the same time, each requested lock lease being part of a lock set having a unique lock set identification.

14. The system of claim 13, wherein the operations further comprise releasing all lock leases in the lock set by sending the unique lock set identification to a locking service.

15. A method comprising:
receiving a first request to perform a first operation to a first component of a computer system;
determining an application impacted by a downtime associated with performing the first operation;
identifying an application instance limit for the application, the application instance limit indicating a minimum number of active application instances of the application;
calculating a current number of active application instances;
determining a number of active application instances that will be unavailable during the first operation;
calculating an effective application availability by subtracting the number of active application instances that will be unavailable during the first operation from the current number of active application instances;
in response to a determination that the effective application availability meets or exceeds the application instance limit:
requesting a lock lease for the first operation from a locking instance, the lock lease reserving the number of active application instances that will be unavailable during the first operation and indicating a lease period;
causing the first operation to be performed; and
after completion of the first operation, releasing the lock lease.

16. The method of claim 15, further comprising:
during the performance of the first operation:
receiving a second request to perform a second operation to a second component of the computer system;
determining the application is impacted by a downtime associated with performing the second operation;
recalculating the current number of active application instances based on the reserved number of active application instances for the first operation;
determining a number of active application instances that will be unavailable during the second operation;
calculating an updated effective application availability by subtracting the number of active application instances that will be unavailable during the second operation from the current number of active application instances; and
in response to a determination that the updated effective application availability does not meet or exceed the application instance limit:
denying the second request, the denial including recommending a time, based on the lease period, to reattempt the second request.

17. The method of claim 15, wherein the computer system is a data center.

18. The method of claim 17, wherein the first component is a hardware switch, and the application impacted by a downtime is an application with active instances that are using the hardware switch.

19. The method of claim 15, further comprising:
in response to a determination that the application is a sticky stateless application, identifying the application instance limit for the application by retrieving a defined rule stored in a data store, and applying the defined rule.

20. A system comprising:
means for receiving a first request to perform a first operation to a first component of a computer system;
means for determining an application impacted by a downtime associated with performing the first operation;
means for identifying an application instance limit for the application, the application instance limit indicating a minimum number of active application instances of the application;
means for calculating a current number of active application instances;means for determining a number of active application instances that will be unavailable during the first operation;
means for calculating an effective application availability by subtracting the number of active application instances that will be unavailable during the first operation from the current number of active application instances;
means for, in response to a determination that the effective application availability meets or exceeds the application instance limit:
means for requesting a lock lease for the first operation from a locking instance, the lock lease reserving the number of active application instances that will be unavailable during the first operation and indicating a lease period;
means for causing the first operation to be performed; and
means for, after completion of the first operation, releasing the lock lease.

* * * * *

UNITED STATES PATENT AND TRADEMARK OFFICE
CERTIFICATE OF CORRECTION

PATENT NO. : 11,803,362 B2
APPLICATION NO. : 17/545342
DATED : October 31, 2023
INVENTOR(S) : Agarwalla et al.

Page 1 of 1

It is certified that error appears in the above-identified patent and that said Letters Patent is hereby corrected as shown below:

On the Title Page

Item (54), in "Title", in Column 1, Line 5, delete "AVAILAILITY" and insert --AVAILABILITY-- therefor In the Specification In Column 1, Line 5, delete "AVAILAILITY" and insert --AVAILABILITY-- therefor Signed and Sealed this
Twenty-sixth Day of December, 2023

Katherine Kelly Vidal
*Director of the United States Patent and Trademark Office*